S. D. REYNOLDS.
RAILROAD MOTOR CAR.
APPLICATION FILED JULY 12, 1909.

950,241.

Patented Feb. 22, 1910.
3 SHEETS—SHEET 2.

WITNESSES:
Eugene Taylor
E. C. Davis Jr.

INVENTOR
Stephen D. Reynolds.
BY Schley & Davis
ATTORNEYS.

UNITED STATES PATENT OFFICE.

STEPHEN D. REYNOLDS, OF HOUSTON, TEXAS.

RAILROAD MOTOR-CAR.

950,241.  Specification of Letters Patent.  Patented Feb. 22, 1910.

Application filed July 12, 1909. Serial No. 507,066.

*To all whom it may concern:*

Be it known that I, STEPHEN D. REYNOLDS, a citizen of the United States, residing at Houston, in the county of Harris and State of Texas, have invented a new and useful Improvement in Railroad Motor-Cars, of which the following is a specification.

My invention relates to new and useful improvements in rail road motor cars. Cars for this purpose now commonly in use, if so constructed that they can be knocked down to be loaded on passenger trains, have the load disposed over one rail with a guide wheel, or wheels to travel on the other rail. This necessitates the front wheel of the loaded side to be so set as to have a lead across the track to keep the side pull of the guide wheels from throwing the car off of the track; therefore the front loaded wheel grinds against the rail at all times, which requires greater power to propel the car, than would otherwise be necessary, and further any little variation or obstruction will cause the car to jump from the track on account of this side pull. Cars now commonly in use that have the weight equally divided over the track, are made in one rigid frame and therefore can only be transported by freight trains.

My invention aims to overcome these difficulties, by the provision of a car with four wheels and a narrow frame suspended therebetween over the center of the track. The four wheels being provided, each with a short axle hung in a truss support detachably connected to the center frame.

Other novel features will be hereinafter pointed out and fully described.

Finally the object of the invention is to provide a device of the character described that will be strong, durable, efficient, and simple and comparatively inexpensive to construct, also one in which the several parts will not be likely to get out of working order.

Figure 1:
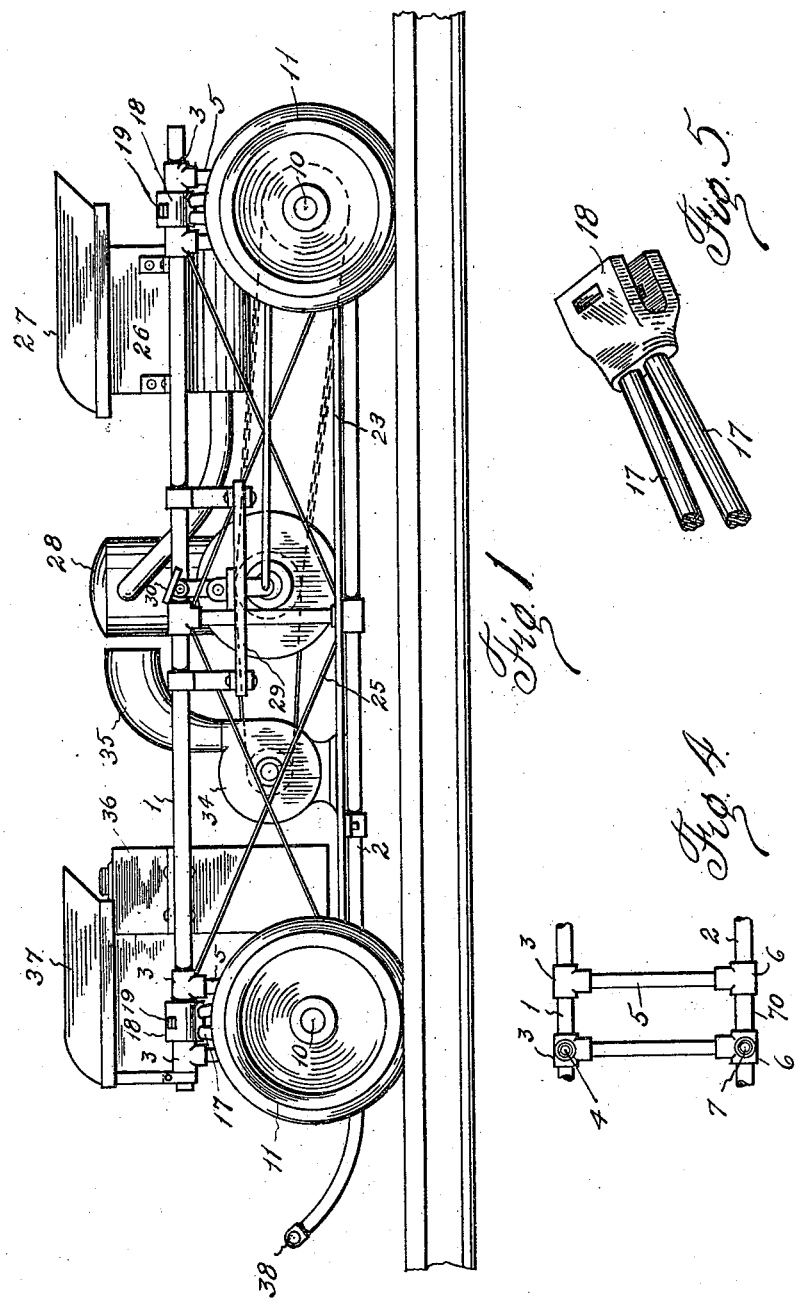
Figure 2:
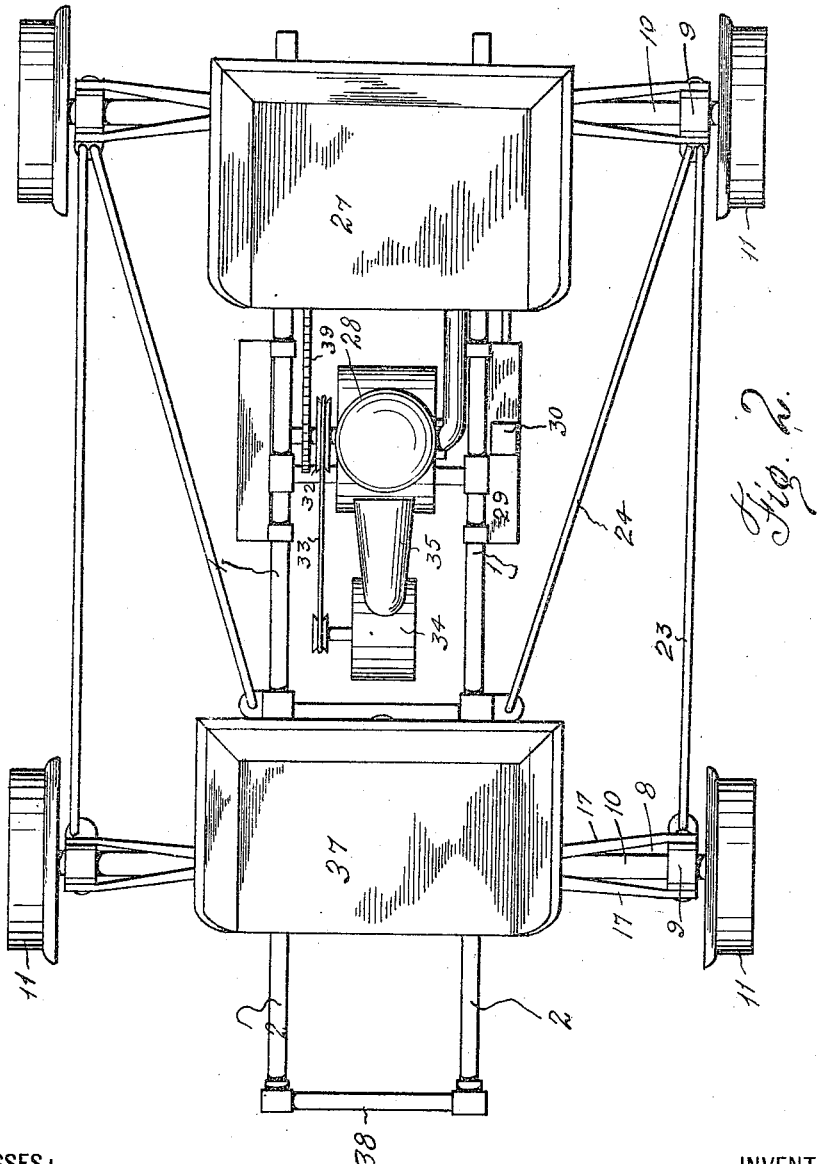
Figure 3:
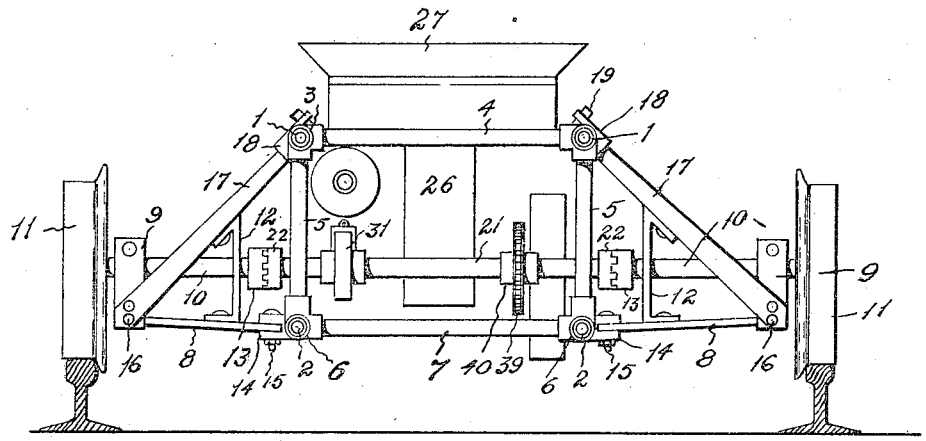
Figure 6:
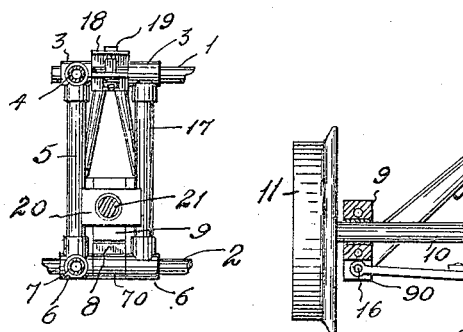
Figure 7:
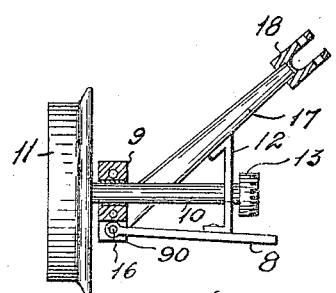
Figure 10:
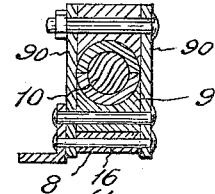
Figure 8:
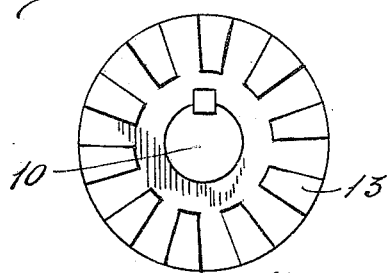
Figure 9:
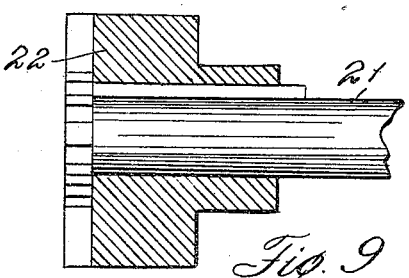

With the above and other objects in view, the invention has relation to certain novel features of construction and operation, an example of which is described in this specification and illustrated in the accompanying drawings, wherein:

Figure 1 is a side elevation of the motor car assembled, Fig. 2 is a plan view of the same, Fig. 3 is a rear elevation, Fig. 4 is a detail of one of the standards, Fig. 5 is a detail in perspective of one of the coupling sockets, Fig. 6 is a detail in elevation of one of the standards and its connections, Fig. 7 is an elevation of one of the units or detachable axle supports, Fig. 8 is a face view of one of the axle couplings, Fig. 9 is a longitudinal section of the same, and Fig. 10 is a vertical section of one of the short axle bearings.

In the drawings, the numeral 1, designates the top longitudinal side bars of a central frame and 2, the bottom longitudinal side bars, the bars being arranged one over the other on each side. Near each end of the bars 1, couplings 3 are secured and adapted to receive horizontal end bars 4. This construction is supported by standards 5 formed of vertical rods or tubular members having their upper ends engaged in the couplings 3; while their lower ends are fastened in couplings 6. The couplings 6 at each end of the frame are connected by a cross bar 7. These couplings 3 and 6 are separated on the bars 1 and 2 for the purpose hereinafter described.

By observing Fig. 3, it will be noted that the frame presents a substantially rectangular shape in cross section and is compact, and rigid. The frame is particularly narrow and hangs over the center of the track. I have shown the bars as constructed of tubing or rods, but it is to be understood that they may be made in other forms and shapes. The frame forms one unit of the car; while the axle supports, each constitute one of the four other units of the motor car.

As each of the axle supports is a duplicate of the other, a description of one will be sufficient for all. The axle support comprises an elongated bottom plate 8, on which and near the outer end thereof, an axle bearing 9 is supported and adapted to receive a driven axle 10 on the extreme outer end of which the usual track wheel 11 is secured. This axle extends inward, passing through a brace 12 and having near its inner end, an axle coupling collar 13, beyond which the shaft projects a short distance as is shown in Fig. 7.

As shown in Fig. 6, between each coupling 6 a collar 70 engaging the bar 1 is formed with a split lug 14 adapted to receive the inner end of the bottom plate 8, which is removably held therein by a bolt 15. The outer end of the bottom plate is looped to receive between the plates 90 of the bearing 9, a horizontal bolt 16 and by which the lower ends of the truss members 17 are fastened, one on each side of the bearing 9. These truss members may be of any form, but are shown as tubes with their lower ends flattened. At their upper ends the members are embedded in a coupling socket 18 which is U-shaped, as shown in Figs. 3, 5 and 7, to embrace the bar 1 between the couplings 60. The socket is provided with a removable pin 19 standing across the inner side of the bar 1 and suitably fastened in place.

It will be observed that by simply removing the pin 19 and the bolt 15 each axle support may be detached from the frame, thus permitting the car to be quickly taken apart and the parts or units passed through the door of a baggage car and compactly stored therein. By observing Fig. 3 it will be seen that when the car is assembled, a perfect truss is formed and a substantial and well braced structure produced.

As shown in Fig. 6 each standard 5 is provided with a bearing 20 through which the end of a shaft or driving axle 21 projects, carrying on its projecting end a toothed coupling collar 22 adapted to receive the toothed collar 13 and the projecting end of the axle 10. When the car is taken apart the axle 21 is supported in place by the bearings 20.

Referring to Figs. 1 and 2, it will be seen that strut links 23 extend on each side of the car from the front axle bearing to the rear axle bearing, acting to keep the wheels 11 in proper position. Brace rods 24 extend from the rear axle bearings forward and are secured forward of the center of the frame to the top bars 1 as is best shown in Fig. 2. These rods keep the axle square and in line with the frame. The rear ends of the rods and both ends of the links are detachably connected to the bearings and suitably fastened thereto when in position. If desired the frame may be braced by truss rods or the like 25, as shown in Fig. 1.

I wish to call particular attention to the equipment of the car. Near the rear axle a tool box 26 having a seat 27, is suitably supported from the top bars 1. The cylinder oil tank may be placed in this box. The engine 28 is suitably supported in front of the tool box; while foot rests 29 are supported from the top bars, one on each side of the engine. A foot lever 30 is supported on one of the foot rests and has suitable connection with a friction brake 31 on the rear driven axle 21 as shown in Fig. 3.

A pulley 32 mounted on the engine shaft drives by means of a belt 33, a fan 34 located in front of the engine and from which a flaring blast tube 35 extends upward and terminates in close proximity to the cylinder of the engine. The air thus delivered will cool the engine and is a very necessary part of the equipment. Near the forward end of the frame a fuel tank 36 is supported from the top bars and at its upper end supports the rear end of a forward seat 37 suitably supported from the top bars at the forward end. At their forward ends the bottom bars 2 are curved upward and support a foot rest 38. Motion may be transmitted to the rear driving axle 21 by any suitable means, but I have shown in the drawings a chain 39 extending from the engine to a sprocket 40 on the rear axle.

A motor car built in accordance with my invention will run smoothly and without grinding the wheels against the rails and there will be no side pull. The tendency to jump from the rails will be reduced to a minimum and the car may be propelled at a high rate of speed without danger to the passengers.

What I claim is:

1. In a railway motor car formed in units, each unit being independent of the other, a frame unit carrying the driving mechanism and means for transmitting motion, and axle supporting units, each comprising a track wheel, means for driving the track wheel, and means for removably connecting the axle unit to the frame unit and engaging the track wheel driving means with the motion transmitting means.

2. In a knock-down railway motor car, a central frame, driving axles carried by the frame, and a plurality of axle members removably engaged with the frame, each comprising, an axle member arranged to detachably engage one of the driving axles, a track wheel fixed on the outer end of the axle member, a bearing in which the axle member is supported, a member extending from the bearing and having removable engagement with the upper portion of the frame, and a member extending from the bearing and having removable engagement with the lower portion of the frame.

3. In a knock-down railway motor car, a frame comprising upper and lower side bars, transverse bars and upright end bars, the lower side bars being extended at the forward end of the frame, a foot rest carried on the extended portions of the side bars, and wheel carrying axle members detachably engaged with the frame.

4. In a knock-down railway motor, a frame, a plurality of detachable axle members secured to the frame at the forward and rear ends thereof, a connection between the axle members on each side of the frame, and a brace rod extending from each rear axle member to the forward portion of the frame, the connections and the brace rods being detachable.

5. In a rail road motor car, a center frame, driving mechanism supported by the frame, axles supported in the frame, a coupling member on each end of each axle, axle supports adapted to be detachably connected to the frame, an axle carried by each support, a track wheel mounted on each of the last named axles, a coupling member carried by each of the last named axles and adapted to engage with one of the coupling members of the first named axle, and means for transmitting motion from the driving mechanism to one of the axles.

6. In a rail road motor car, a center frame, driving mechanism supported by the frame, axles supported in the frame, a coupling member carried on each end of each axle, axle supports including inclined truss members, a socket connected to the truss members of each axle support adapted to engage the upper portion of the frame, means for detachably connecting the lower portion of each axle support with the frame, short axles carried by the supports, a coupling member carried by each short axle and adapted to engage one of the coupling members of the frame carried axle, a track wheel mounted on each short axle, and means for transmitting motion from the driving mechanism to one of the axles.

7. In a railroad motor car, the combination with a frame, and axle members carried by the frame, of a plurality of detachable axle supporting members, each comprising, a truss member, a bearing member carried at the lower end of the truss member, an axle supported in the bearing member and arranged to engage with one of the axle members of the frame, a traction wheel carried on the outer end of the axle, means for detachably connecting the upper end of the truss member with the upper end of the frame, and means for detachably connecting the lower portion of the axle supporting member with the lower portion of the frame.

8. In a railroad motor car, an elongated central frame exhibiting a rectangular shape in cross section, and a supporting member carrying a wheel and an axle, two members disposed on each side of the frame, the said members each being spaced substantially the same distance from the frame and having detachable connection therewith and rigidly held against movement toward the frame whereby each member may be removed from the frame without disconnecting the parts of the member.

9. In a railroad motor car, an elongated central frame having side bars spaced apart whereby driving mechanism is supported therebetween, axle members carried by the frame, detachable axle supports equally spaced from the frame on each side thereof, axles carried by the supports arranged to engage with the axle members, wheels carried by the axles, and means for removably connecting each axle support with the side bars of the frame.

10. In a railroad motor car, an elongated central frame exhibiting a rectangular shape in cross section, axle members mounted in and extending through the frame transversely thereof, a coupling member carried on each end of each axle member, axle supports having removable engagement with the frame, an axle carried by each support, a wheel carried on the outer end of each axle, and a coupling member carried on the inner end of each axle positioned to engage one of the coupling members of the axle members, all of the wheels being spaced substantially the same distance from the frame whereby the latter is supported centrally between the wheels.

In testimony whereof I have signed my name in the presence of two witnesses.

STEPHEN D. REYNOLDS.

Witnesses:
S. N. HALL,
JACK A. SCHLEY.